UNITED STATES PATENT OFFICE.

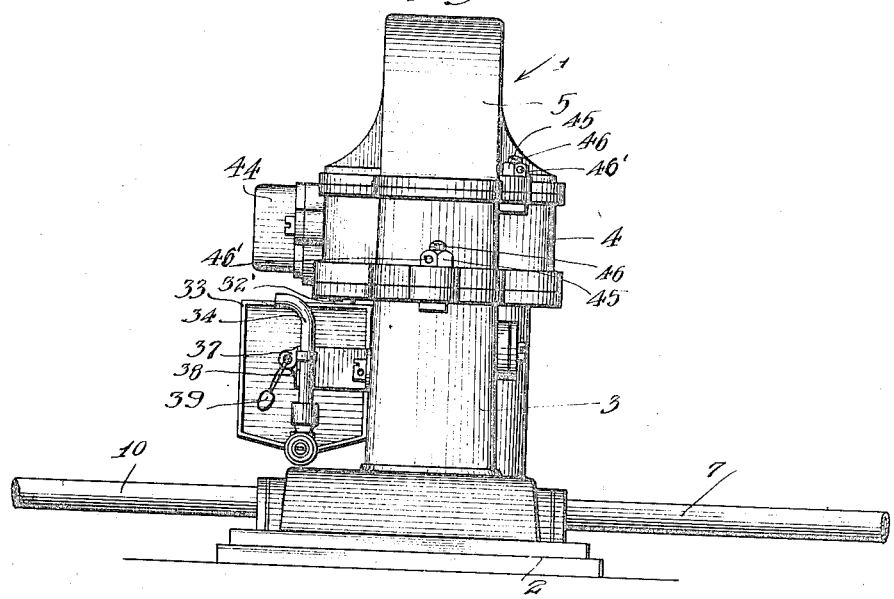
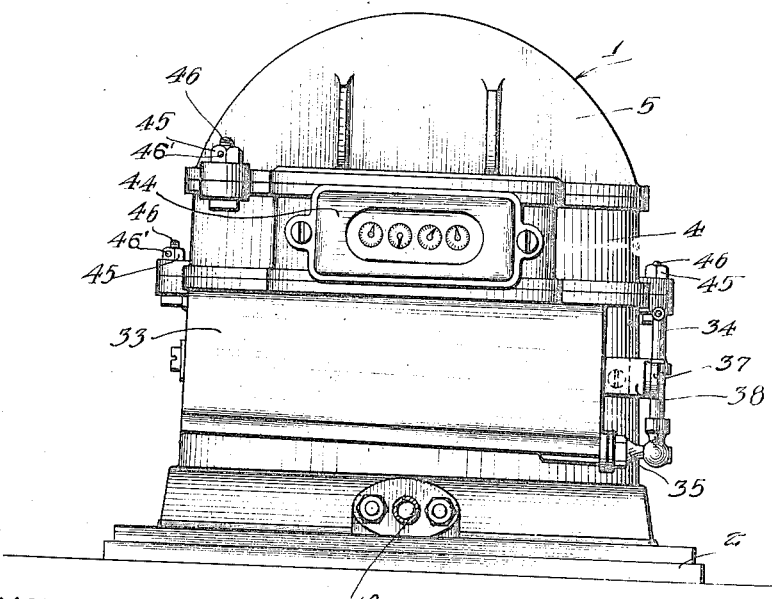

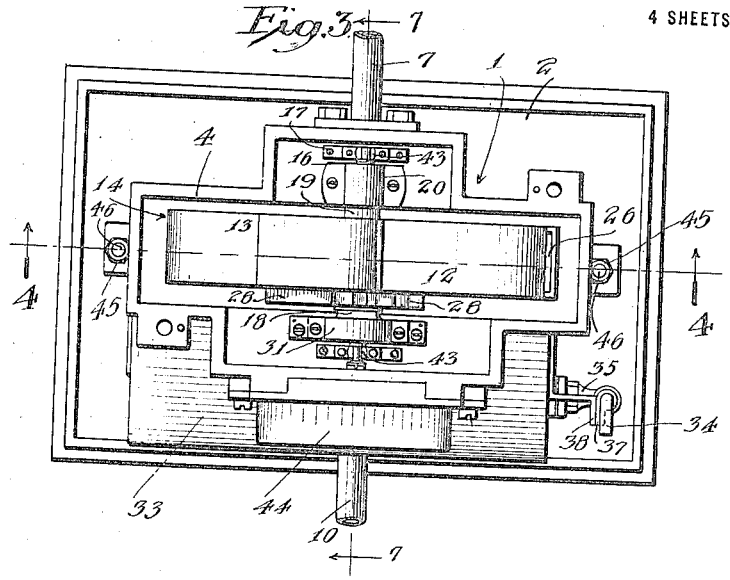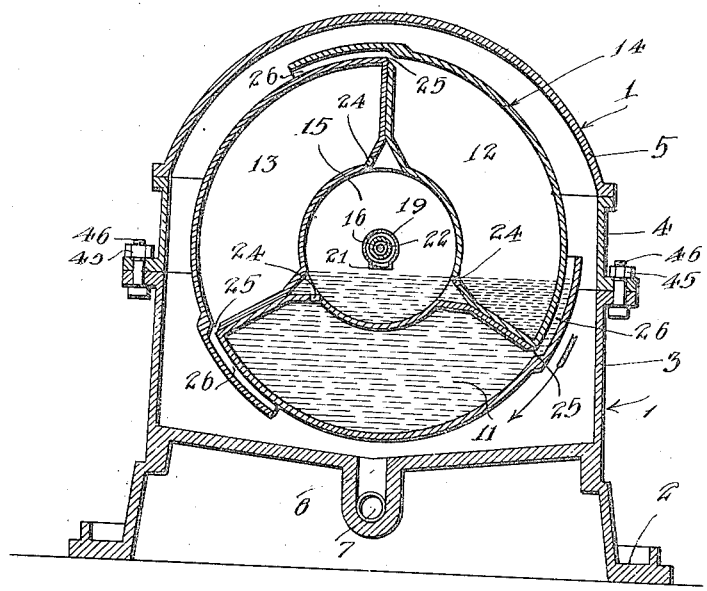

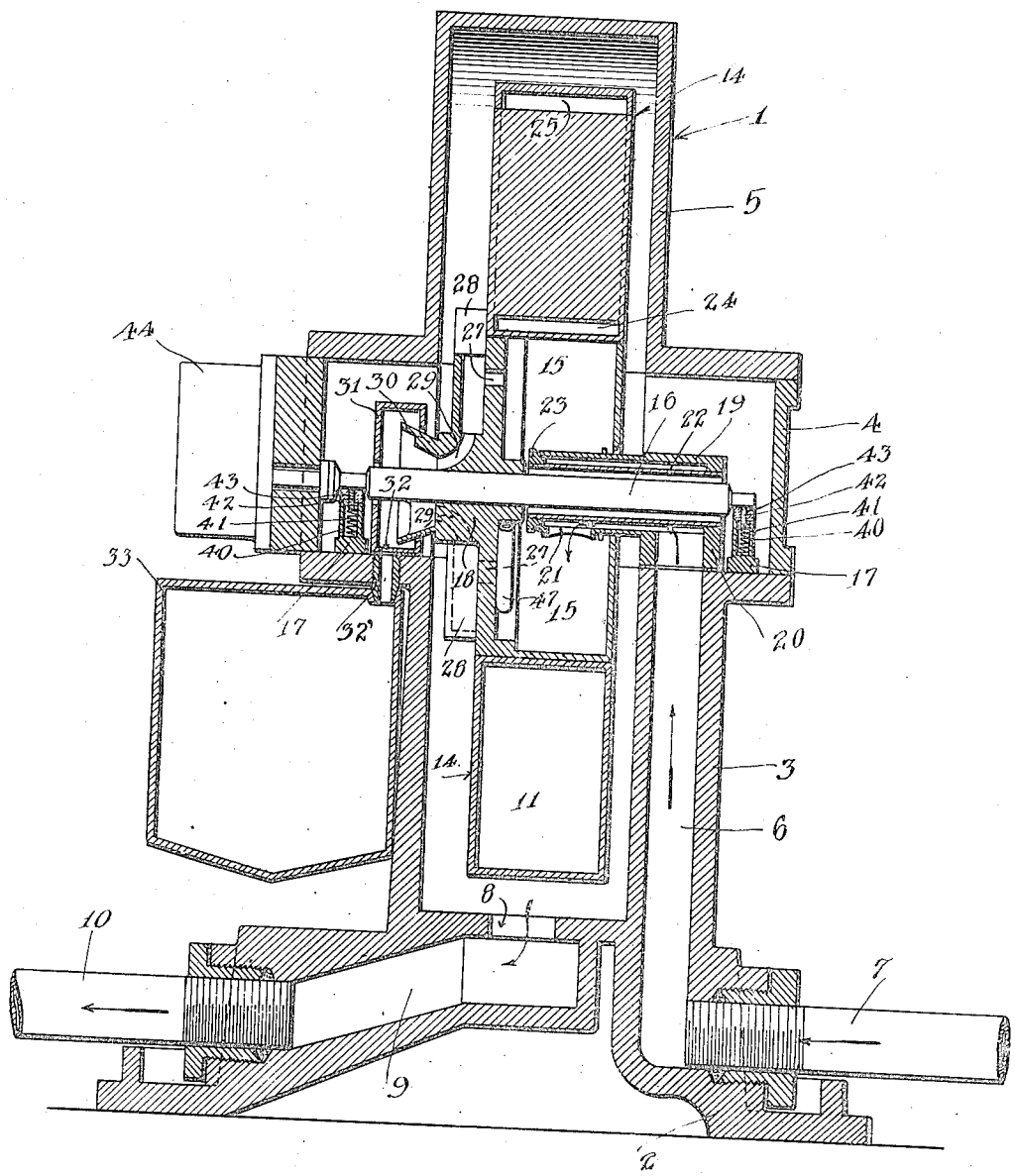

JAMES L. VAI AND GIOVANNI VAI, OF LOS ANGELES, CALIFORNIA.

LIQUID-MEASURING DEVICE.

1,254,452.

Specification of Letters Patent.

Patented Jan. 22, 1918.

Application filed December 23, 1915. Serial No. 68,310.

*To all whom it may concern:*

Be it known that we, JAMES L. VAI, a citizen of the United States, and GIOVANNI VAI, a subject of the King of Italy, both residing at Los Angeles, in the county of Los Angeles and State of California, have invented a new and useful Liquid-Measuring Device, of which the following is a specification.

This invention relates to a device for measuring liquids as to quantities and provides for the testing of the quality of liquids.

An object of this invention is to provide measuring means through which a large quantity of liquid may be passed and while being passed therethrough will be measured in predetermined quantities, there being means provided to withdraw a fractional amount of each predetermined quantity and deposit the amount withdrawn into a receptacle in order that the quality of the liquid or an average quality of a large amount of the liquid measured in smaller predetermined amounts may be ascertained by testing the amount withdrawn from that which passes through the measuring means.

Another object is to provide a measuring device of this character which will register the total amount of liquid passing through the measuring means.

A further object is to provide a device of the above mentioned character which is of simple construction, reliable and efficient in operation and inexpensive to manufacture.

Other objects and advantages will appear from the subjoined detailed description.

The accompanying drawings illustrate the invention.

Figure 1 is a side elevation of the device;

Fig. 2 is a front elevation;

Fig. 3 is a top plan view with a portion of the housing removed;

Fig. 4 is a longitudinal sectional view taken on line 4—4 of Fig. 3;

Fig. 7 is an enlarged vertical sectional view taken through the entire device.

Figure 5:
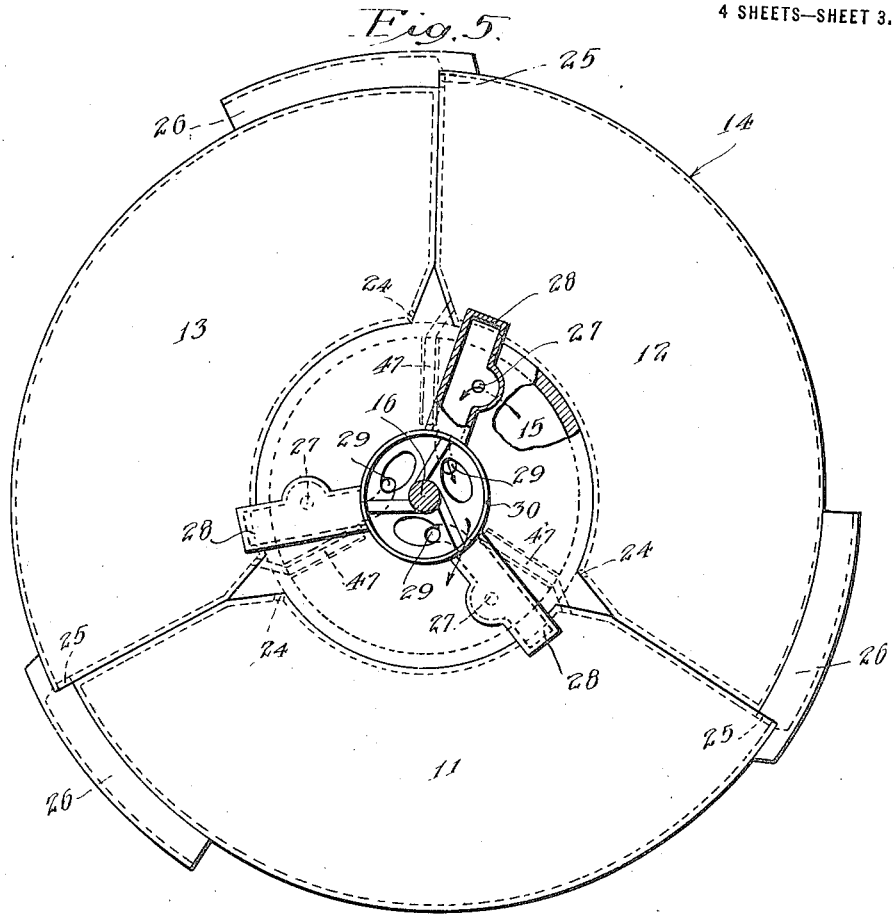
Fig. 5 is a front elevation of the measuring means through which the liquid passes.
Figure 6:
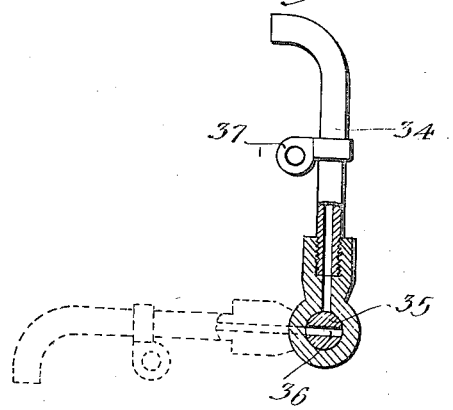
Fig. 6 is an enlarged detail side elevation of the valved outlet for the testing receptacle showing it partly in section.

Referring to the drawings, 1 designates a housing which comprises a flanged hollow base portion 2 and sections 3, 4 and 5 which are bolted to one another. Formed in one side wall of the housing 1 is a vertical liquid inlet passage 6 which at its lower end communicates with a liquid inlet 7 and terminates at its upper end at the upper edge of the section 3 of the housing 1. An outlet opening 8 is formed in the bottom wall of the housing and communicates with a lateral outlet passage 9 formed in the base portion 2 of the housing. An outlet pipe 10 communicates with the passage 9.

Mounted within the housing 1 is measuring means through which the liquid passes and is measured in predetermined amounts. This means comprises a plurality of arcuate measuring receptacles or tanks 11, 12 and 13 of a predetermined capacity and which are joined to one another in such manner as to form a substantially circular measuring member 14, and there is provided an annular chamber 15 between the inner faces of the tanks and sides of the measuring member 14.

Extending through the center of the member 14 is a horizontal shaft 16 which is mounted at its ends upon bearings 17 supported by the housing 1. The member 14 is provided centrally and upon one side wall with an enlargement or boss 18 through which the shaft 16 extends. The member 14 is rigidly secured at this point to the shaft.

Surrounding the shaft 16 at one end thereof is a sleeve 19 which communicates by means of an extension 20 with the passage 6. This sleeve at its inner end is provided with an outlet 21 communicating with the chamber 15. A sleeve 22 of smaller diameter than the sleeve 19 is mounted within the sleeve 19 and encircles the shaft 16. An internally screw-threaded ring 23 is turned upon the inner end of the sleeve 22 and wedges against the adjacent inner end of the sleeve 19 so as to close said sleeve at its inner end.

Each of the tanks 11, 12 and 13 is provided with an inlet opening 24 upon its inner face at one end thereof. Each tank at the end thereof opposite that in which the opening 24 is formed, is provided with an outlet opening 25 which communicates with a curved outlet tube 26 mounted upon the periphery of the member 14 and extending in the direction of the next adjacent tank. For example, as shown in Fig. 4 of the drawings the tube 26 of the tank 11 extends toward the tank 12 concentric therewith and at its discharge end terminates in line with the horizontal axis of the member 14.

It will be observed that the inner and outer walls of each tank are concentric with the axis of rotation substantially the entire length thereof, whereas the end walls or partitions which separate the tanks extend nearly their full length on radial lines intersecting said axis. The central compartment has an outlet opening into each tank at a point out of the plane of said intersecting lines, said opening being formed in one inclined wall of a V-shaped portion at the inner end of the partition, whereby an annular liquid space is provided surrounding a central circular compartment and concentric therewith on both the outer and inner circles describing said space, and the measuring member is nicely balanced, so that when the lowermost tank is filled and the liquid rises in the compartment and flows into the next adjacent tank, the center of gravity will be shifted and the measuring member overbalanced the instant the liquid rises above the level of the inlet to the tank, whereupon the measuring member will begin to rotate, and at the same time the liquid in the lowermost tank will begin to flow out. As the rotation is continued the lowermost tank will be gradually emptied and the next adjacent partially filled tank simultaneously filled in about the same period of time. Another tank meanwhile is brought into filling position and filled to a sufficient extent to again overbalance the measuring member an instant after the lowermost tank is entirely emptied, and thereupon the operation of emptying one tank and simultaneously filling another will be repeated, and so on, thus keeping the measuring member in rotation practically continuously, instead of a pulsatory or intermittent movement, by continued displacement of the center of gravity due to the flow of the liquid out of the lowermost tank and into the partially filled tank in about equal proportions from the beginning to the end of the emptying and filling operation. We thus secure more accurate measurement and in less time than is possible with apparatus of this type as heretofore constructed, operating intermittently or with a pulsatory movement.

The measuring member 14 may be constructed otherwise than as shown, but it is preferably composed of a plurality of sections in the form of segments of an annular hollow body extending around and together forming a central cylindrical compartment and a series of tanks of arcuate form surrounding said compartment, one segment being an exact counterpart of another and each formed by bending a flat metallic plate so as to provide outer and inner walls concentric with the axis of rotation and radially disposed end-portions which are bent at their inner ends so that the two end portions of adjacent tanks united end to end will form V-shaped spaces or pockets opening into the central compartment, as shown more clearly in Fig. 4 of the drawings, each pocket having an outlet port in one inclined wall thereof which opens into the adjacent tank. The outer wall of each section is formed with a peripheral extension which overlaps the next adjacent tank concentric therewith but slightly separated therefrom so that a discharge spout or tube is formed between the two parts. Side plates of arcuate form are fitted between the outer and inner walls formed by the first mentioned plate while the ends of the central compartment are closed by circular plates or disks fitted therein, and the several parts thus constructed and assembled are united by soldering or otherwise, thus forming a practically integral structure having inlet and exit openings or ports as hereinbefore described. When occupying the position shown in Fig. 4, the V-shaped spaces or pockets at the inner ends of the radial partitions in effect enlarge or widen the liquid space at the bottom of the central compartment, and on rotation the V-shaped space on the rising side of the drum soon empties, whereas the corresponding space on the descending side remains full; and the drum being nicely balanced will be overbalanced the instant the liquid rises above the level of the outlet port into the next tank to be filled after the lowermost tank has been filled, thus causing the drum to rotate, whereupon the liquid in the lowermost tank will begin to flow out while the incoming liquid continues to flow from the central compartment into the next adjacent tank, thereby continuously overbalancing and keeping the drum in motion, causing one tank to be emptied and another filled and a third tank brought into position to be filled by the time the liquid contents of the tank that is being emptied have been fully discharged, and this operation will be repeated thus automatically filling and emptying the tanks in succession so long as the inflow of the liquid from the still or source of supply is continued.

One side wall of the compartment 15 is formed with a plurality of outlet openings 27 which connect the interior of the compartment 15 with tubes or compartments 28 radially carried on the outer side of said wall of the compartment 15. These compartments 28 at their inner ends communicate with tortuous passages 29 formed through the boss 18 and on its outer end the boss 18 is provided with a flared discharge spout 30 into which the passages 29 open. A housing 31 receives the spout 30 and on its lower side is provided with an outlet 32 communicating with which, is a discharge pipe 32' that extends through the wall of the housing 1 and into a tank or receptacle 33. The receptacle 33 is adapted to contain the liquid which is to be tested and is carried upon the outer face of the housing in any suitable manner. There is provided a valved outlet nozzle which is pivoted upon an outlet pipe 35 carried by the receptacle 33. The pipe 35 is provided with a valve 36 so arranged that when the nozzle 34 is upright the valve is closed and when it is horizontal the valve is open. An ear 37 is carried upon the nozzle and is adapted to aline with an ear 38 carried on the side of the receptacle 33 so that a seal 39 may be passed through the alined ears to lock the member 34 in closed position, as shown in Fig. 1 of the drawings.

The bearings 17 for the shaft 16 comprise hollow standards 40 in which are mounted springs 41. These springs bear against the inner ends of bearing elements 42 which contact with the shaft, said elements 42 being slidable in the main bearing members 43 which are supported upon the standards in contact with the shaft. The spring-pressed bearing members 42 act as brakes and provide for a steady and balanced rotation of the shaft and parts carried thereby.

A register 44 is mounted upon one side face of the housing 1 and may be of any suitable construction. The shaft 16 extends into and operates the register mechanism so that the amount of liquid passing through the device will be registered.

It will be noted that the nuts 45 turned upon the bolts 46 which secure the sections of the housing 1 together may be provided with apertures 46′ extending therethrough and alining with similar apertures in the bolts 46. This is done in order that seals such as the one 39 may be inserted through the bolts and nuts and the device can not be taken down without detection.

Mounted within the compartment 15 are overflow tubes 47 which radiate from the center of the compartment on the side wall thereof and communicate with the tanks 11, 12 and 13. The tubes serve to prevent the liquid from rising above the outlet 21 in the sleeve 19.

In operation, assuming that the pipe 7 is connected with a source of liquid supply, not shown, the liquid will pass up through the passage 6 into the member 20 and thence into the sleeve 19 and out through the outlet 21 thereof into the compartment 15. The measuring member 14 is so constructed and mounted upon the shaft that it will assume the balanced position shown in Fig. 4 in the drawings. Liquid entering the compartment 15 will first enter the tank 11 through the port 24 and fill the tank 11. When the tank 11 is filled the liquid will rise in the compartment 15 until its level is high enough to allow it to flow into the tank 12 through its port 24. As soon as liquid begins to flow into the tank 12 the member 14 is over-balanced and caused to rotate in a clockwise direction. The liquid is continuously flowing into the compartment and as more of it enters the tank 12 the rotation of the member 14 continues until the tube 26 of the tank 11 reaches such a position that the liquid will rapidly discharge from the tank 11 into the housing 1 and out through the outlet 8, pasage 9 and outlet pipe 10. When the tank 11 is filled and the liquid rises in the compartment 15 a small portion of the liquid will flow through the opening 27 on the lower side of the compartment 15 into one of the compartments 28 and upon the rotation of the member 14 this liquid will flow from the compartment 28 through the passage 29 communicating therewith and from thence out of the spout 30 through the pipe 32′ and into the tank 33. It will thus be seen that a predetermined fractional amount of the liquid of the determined measured amounts will be conducted to the tank 33. After the tank 11 has discharged its contents and has moved into the position in which the tank 13 is shown in Fig. 4, the tank 12 is in the former position of the tank 11 and is receiving the liquid, whereas the tank 13 will receive the liquid after the tank 12 is filled and cause the member 14 to rotate and the tank 12 to discharge. This operation is continued and it will be seen that the member 14 will continue to rotate so long as there is a sufficient flow of liquid from the still or source of supply into said member. As shown in the drawings, the device is constructed so that at every rotation of the member 14 three quarts of liquid are measured and discharged out from the pipe 10; also a predetermined fractional amount of each quart is discharged into the tank 33. The meter 44 registers the amount of liquid that has passed through the device.

This measuring device while adapted for measuring and providing for the testing of liquids of various characters is particularly adapted for use in connection with spirituous liquors and in this connection it may be used for Government measuring and testing purposes. The device may be sealed after the manner described when put into operation so that it cannot be tampered with without detection during the operation thereof. By drawing off a portion of the liquid in the tank 33 and testing it the quality of the liquid may be determined. The liquid in the tank 33 reaches a fractional amount of each predetermined amount whether gallon or quart that passes through the tanks of the measuring device. Thus the quality of each predetermined amount may be determined instead of the quality of the total amount as a whole.

It is understood that the invention is not limited to the exact construction shown in the drawings and described above, but that deviations therefrom may be made within the spirit and scope of the invention.

We claim:

1. In a liquid measuring device, a circular rotary measuring member comprising a plurality of arcuate tanks secured to one another end to end, each tank being constructed in the form of a segment of an annular hollow body extending around and together forming a compartment centrally of the member having communication with each of the tanks, means to supply liquid to the compartment whereby the lowermost of the tanks is first filled and the next lowermost tank is partially filled to cause the members to rotate and the liquid to discharge from the first named tanks, each of said tanks having an outlet communicating with and extending from one end thereof concentric with the next adjacent tank, a receptacle, and means to withdraw and conduct a portion of the liquid from the compartment to the receptacle upon every revolution of the measuring member.

2. In a liquid measuring device, a circular rotary measuring member comprising a plurality of arcuate tanks secured to one another and a compartment centrally of the member having communication with each of the tanks, means to supply liquid to the compartment whereby the lowermost of the tanks is first filled and the next lowermost tank is partially filled to cause the members to rotate and the liquid to discharge from the first named tanks, each of said tanks having an outlet communicating with and extending from one end thereof concentric with the next adjacent tank, a receptacle, and means to conduct into said receptacle a fractional amount of the liquid in the compartment into the receptacle during every revolution of the measuring member.

3. In a liquid measuring device, a housing having an inlet and an outlet, a circular rotary measuring member mounted within said housing comprising a plurality of arcuate tanks connected with one another end to end, each tank being constructed in the form of a segment of an annular hollow body extending around and together forming a compartment centrally of the member and communicating with each tank, means within the compartment and communicating with the inlet to direct liquid downwardly from the center of the compartment to the lower side thereof whereby the liquid will enter and fill the lowermost tank and then enter the next lowermost tank causing the member to over-balance and rotate within the housing, each tank having an outlet extending from one end thereof toward and concentric with the next adjacent tank, a stationary receptacle, a conduit leading to the receptacle, said compartment having a series of openings therein communicating with the conduit and located to permit liquid in the compartment to enter the conduit and flow into the receptacle during the rotation of the measuring member.

4. In a liquid measuring device, a housing having an inlet and an outlet, a circular rotary measuring member mounted within said housing comprising a plurality of arcuate tanks connected with one another end to end, each tank being constructed in the form of a segment of an annular hollow body extending around and together forming a compartment centrally of the member and communicating with each tank, means within the compartment and communicating with the inlet to direct liquid downwardly from the center of the compartment to the lower side thereof whereby the liquid will enter and fill the lowermost tank and then enter the next lowermost tank causing the member to over-balance and rotate within the housing, each tank having an outlet extending from one end thereof toward and concentric with the next adjacent tank, a receptacle, and means operating when the member rotates to conduct a portion of the liquid from the compartment into said receptacle.

5. In a liquid measuring device, a housing, a circular measuring device rotatably mounted within the housing comprising a plurality of arcuate tanks connected with one another and a central compartment, said tanks each having an opening therein communicating with the compartment, said tanks having compartments upon the outer side faces thereof communicating with the interior of the central compartment, a receptacle having communication with said compartments on the outer side faces of the tanks, means to discharge a liquid from the center of said first named compartment downwardly toward the lower side thereof whereby the lowermost tank receives the liquid first, and a discharge tube connected with each tank at one end thereof and extending concentric with and toward the next adjacent tank.

6. In a liquid measuring device, a rotary circular measuring member comprising a plurality of tanks connected at their ends with one another and a central compartment, each of said tanks having an opening therein communicating with the central compartment, a liquid inlet communicating with the central compartment, an outlet tube carried by each tank and extending from one end thereof toward and concentric with the next adjacent tank, said measuring member having a plurality of compartments on one outer side face thereof communicating with the central compartment, and a receptacle having communication with said last named compartments.

7. In a liquid measuring device, a housing having an inlet and an outlet, a horizontal shaft rotatably mounted within the housing, a plurality of arcuate tanks secured to one another and fixed to the shaft, each of said tanks being constructed in the form of a segment of an annular hollow body extending around and together forming a central compartment, means communicating with said inlet and said compartment to conduct liquid to and fill the tanks one at a time, each of said tanks having a discharge opening normally disposed in non-discharging position and moving into discharging position upon the rotation of the tanks and shaft, a receptacle, and means to conduct a fractional amount of liquid entering the tanks during each revolution of the tanks to the receptacle.

8. In a liquid measuring device a rotary measuring member comprising a plurality of tanks, each constructed in the form of a segment of an annular hollow body extending around and together forming a compartment centrally of the member having communication with each of the tanks, means to supply liquid to the compartment whereby the lowermost tank is filled and the next lowermost tank is partially filled to cause the member to rotate and the liquid to discharge from the first-named tank, each of said tanks having an outlet, a receptacle independent of the tanks, and means to withdraw and conduct a portion of the liquid from one of the tanks to the receptacle upon every revolution of the measuring member.

9. In a liquid measuring device, a housing, a shaft mounted within said housing, a rotary measuring member mounted upon the shaft and comprising a series of tanks and a central compartment, means to supply liquid to the compartment having communication with each of the tanks, a receptacle independent of the measuring member, said housing and measuring member having passages connecting the compartment with the receptacle, and means within the compartment to receive a portion of the liquid entering the compartment to conduct said liquid to the passages and receptacle once during every revolution of the member.

10. In a liquid measuring device, a rotary measuring member comprising a series of tanks and a central compartment, means to supply liquid to the compartment, said compartment having communication with each of the tanks, a receptacle independent of the measuring member, said central compartment having discharge openings in one side wall thereof, a housing mounted on the receptacle and communicating therewith, a discharge spout carried by the measuring member and extending into and rotating within the housing, said discharge spout having communication with each of the discharge openings in the central compartment.

11. In a liquid measuring device, a housing, a shaft rotatably mounted within the housing, a rotary measuring member fixed to and adapted to rotate with the shaft, said member comprising a series of arcuate tanks communicating with one another, and a central compartment surrounding the shaft and communicating with each of the tanks, means to supply liquid to the compartment, each of said tanks having an outlet, said compartment having a series of discharge openings, a receptacle carried by the housing, a housing carried by the receptacle and having communication therewith, a discharge spout carried by the measuring member surrounding the shaft and extending into the last named housing, said spout having communication with each of the discharge openings in the compartment.

12. In a liquid measuring device, a housing, a horizontal shaft rotatably mounted within the housing, a liquid measuring member mounted upon the shaft to rotate therewith and comprising a series of tanks and a compartment centrally of the tanks, said tanks communicating with each other, and the compartment, said tanks having discharge openings, a sleeve surrounding the shaft and extending into the compartment, said sleeve having a discharge opening at its inner end communicating with the compartment, a liquid inlet pipe, communicating with the sleeve, said compartment having a series of discharge openings in one side wall thereof, a receptacle carried by the housing, and a discharge spout having communication with each of the discharge openings in the compartment and the receptacle and being carried by the measuring member.

13. In a liquid measuring device, a rotary measuring member comprising a plurality of tanks each constructed in the form of a segment of an annular hollow body extending around and together forming a compartment centrally of the tanks and having communication with each tank, means to supply liquid to the compartment whereby the lowermost of the tanks is first filled and the next lowermost tank is partially filled to cause the members to rotate, said compartment having discharge openings in one side wall thereof through which liquid discharges upon the rotation of the measuring member, a receptacle, and means to withdraw and conduct a portion of the liquid in the compartment to the receptacle upon every revolution of the measuring member a distance equal to the length of one tank.

14. In a liquid measuring device, a rotary measuring member comprising a central compartment and tanks of arc-like form surrounding said compartment, each tank having a discharge tube extending from one end thereof toward and concentric with the next adjacent tank and inner and outer walls both concentric with the axis of rotation approximately the full length thereof, whereas both end walls extend on radial lines from said outer wall to a point near said inner wall where they diverge to the cylindrical portions of said inner wall, thus forming pockets which open into said central compartment, each pocket having an outlet port therein, whereby practically continuous rotation of the measuring member is effected, emptying one tank and simultaneously filling another in about the same space of time.

15. In a liquid measuring device, a rotary measuring member comprising a central compartment and tanks of arc-like form surrounding said compartment, each tank having a discharge tube extending from one end thereof toward and concentric with the next adjacent tank and inner and outer walls both concentric with the axis of rotation approximately the full length thereof, whereas both end walls extend on radial lines from said outer wall to a point near said inner wall where they diverge to the cylindrical portions of said inner wall, thus forming pockets which open into said central compartment, each pocket having an outlet port therein, whereby practically continuous rotation of the measuring member is effected, emptying one tank and simultaneously filling another in about the same space of time, together with means for withdrawing a proportional amount of the measured liquid during each revolution of the measuring member.

16. In a liquid measuring device, a rotary measuring member comprising a centrally disposed compartment and tanks of arc-like form surrounding said compartment, each tank being provided with a discharge tube extending from one end thereof toward and concentric with the next adjacent tank and having inner and outer walls both concentric with the axis of rotation substantially the entire length thereof and end walls extending nearly their full length on radial lines from said outer wall to a point near said inner wall where they diverge to the cylindrical portions of said inner wall, thus forming substantially V-shaped pockets which open into said central compartment, each pocket having an outlet port in one inclined wall thereof, a separate receptacle, and means for withdrawing and conveying to said receptacle a proportional amount of the measured liquid during each revolution of the measuring member.

17. In a liquid measuring device, a housing having an inlet passage, a shaft having its bearings in said housing, a rotary measuring member mounted on said shaft comprising a central compartment and tanks of arc-like form surrounding said compartment and in communication therewith, each tank having a discharge tube extending toward and concentric with the next adjacent tank and inner and outer walls concentric with the axis of rotation, the end walls of the tank extending upon radial lines intersecting said axis, a sleeve through which said shaft extends, a second sleeve surrounding the first-named sleeve and slightly separated therefrom so as to provide a passage therebetween communicating with said inlet passage and with the interior of said compartment; said compartment having outlet openings in one side wall thereof for withdrawing a portion of the liquid passing therethrough during each revolution, a discharge spout on the outer side of said side walls, and radially disposed discharge tubes on the outer side of said side wall in communication with said openings and with passages leading to said spout.

18. In a liquid measuring device, a housing having an inlet passage, a shaft having its bearings in said housing, a rotary measuring member mounted on said shaft comprising a central compartment and tanks of arc-like form surrounding said compartment and in communication therewith, each tank having a discharge tube extending toward and concentric with the next adjacent tank and inner and outer walls concentric with the axis of rotation, the end walls of the tank extending upon radial lines intersecting said axis, a sleeve through which said shaft extends, a second sleeve surrounding the first named sleeve and slightly separated therefrom so as to provide a passage therebetween communicating with said inlet passage and with the interior of said compartment; said compartment having outlet openings in one side wall thereof for withdrawing a portion of the liquid passing therethrough during each revolution, a discharge spout on the outer side of said wall, and radially disposed discharge tubes on the outer side of said side wall in communication with said openings and with passages leading to said spout, together with a receptacle removably attached to said housing, and means for conducting the liquid from said spout into said receptacle.

19. In a liquid measuring device, a rotary measuring member comprising a cylindrical compartment having a series of tanks of arc-like form mounted thereon, each tank having inner and outer walls concentric with the axis of rotation approximately the full length thereof and end walls extending on radial lines from said outer wall to a point near said inner wall where they diverge to the cylindrical portions of said inner wall, thus forming substantially V-shaped pockets which open into said central compartment, each pocket having an outlet port in one inclined wall thereof and each tank having a discharge spout at one end extending toward and concentric with the next adjacent tank; said compartment having an outlet port opening into each tank at a point out of the plane of said interesecting lines, and means for supplying liquid to said compartment, together with means for withdrawing a portion of the liquid passing therethrough during each revolution.

20. In a liquid measuring device, a rotary measuring member comprising a central compartment with tanks of arc-like form mounted thereon, each tank having a discharge spout extending toward and concentric with the next adjacent tank; said compartment having a discharge port opening into each tank and outlet openings in one side wall thereof and a centrally disposed discharge spout on the outer side of said side wall, radially disposed discharge tubes on said side wall in communication with said outlet openings and with passages leading to said discharge spout, and overflow pipes leading from the center of said compartment into said tanks.

21. In a liquid measuring device, a housing having an inlet passage, a shaft having its bearings in said housing, a sleeve through which said shaft extends, a second sleeve inclosing the first-named sleeve so as to provide a liquid passage therebetween, a rotary measuring member mounted on said shaft comprising a central compartment into which said sleeves extend and tanks of arc-like form arranged around said compartment, each tank having a discharge tube extending from one end thereof toward and concentric with the next adjacent tank; said second sleeve being in communication with said inlet passage and with said compartment; said compartment having a discharge port opening into each tank and outlet openings in one side wall thereof, a flaring discharge spout on the outer side of said side wall, and radially disposed discharge tubes on the outer side of said side wall in communication with said outlet openings and with the passages leading to said discharge spout.

22. In a liquid measuring device, a housing having an inlet passage, a shaft having its bearings in said housing, a rotary measuring member mounted on said shaft comprising a central compartment communicating with said inlet passage and having tanks thereon of arc-like form, each tank having a discharge tube extending toward and concentric with the next adjacent tank; said compartment having a discharge port opening into each tank and outlet openings in one side wall thereof, a flaring discharge spout on the outer side of said side wall and radially disposed discharge tubes on the outer side of said side wall in communication with said outlet openings and with passages leading to said discharge spout, a receptacle beside said housing, and an outlet tube extending from said discharge spout into said receptacle.

23. In a liquid measuring device, a rotary measuring member comprising a series of interconnected segments of an annular hollow body together forming a central cylindrical compartment and a series of tanks of arc-like form surrounding said compartment, each tank having a discharge tube extending from one end thereof toward and concentric with the next adjacent tank, the end walls of the tank being extended on radial lines intersecting the axis of rotation of the measuring member, and said compartment having an outlet port opening into each tank, whereby practically continuous rotation of the measuring member is effected.

24. In a liquid measuring device, a rotary measuring member comprising a series of interconnected segments of an annular hollow body together forming a central cylindrical compartment and a series of tanks of arc-like form surrounding said compartment, each tank having a discharge tube extending from one end thereof toward and concentric with the next adjacent tank, and the end walls of said tanks being extended on radial lines intersecting the axis of rotation of the measuring member, said compartment having an outlet port opening into each tank at a point out of the plane of said intersecting lines, whereby practically continuous rotation of the measuring member is effected, emptying one tank and simultaneously filling another in about the same space of time.

25. In a liquid measuring device, a housing having inlet and discharge passages therein, a shaft having its bearings in said housing, a rotary measuring member mounted on said shaft and comprising a central compartment and tanks of arc-like form surrounding said compartment and in communication therewith, each tank having a discharge tube extending toward and concentric with the next adjacent tank and inner and outer walls concentric with the axis of rotation, said member having outlet openings in one side wall thereof, a sleeve through which said shaft extends, a second sleeve surrounding the first named sleeve and slightly separated therefrom so as to provide a passage therebetween communicating with said inlet passage and having an outlet communicating with said compartment, a receptacle beside said housing in communication with said measuring member through said openings in one side wall thereof, whereby a portion of the liquid passing through said measuring member is withdrawn and conducted into said receptacle during each revolution.

26. In a liquid measuring device, a rotary measuring member comprising a central compartment with tanks of arc-like form mounted thereon, each tank having a discharge spout extending toward and concentric with the next adjacent tank; said compartment having a discharge port opening into each tank and provided with a centrally disposed inlet, together with overflow pipes therein leading into said tanks and adapted to prevent the liquid from rising in said compartment above the inlet thereto.

27. In a liquid measuring device, a housing having an inlet passage, a shaft having its bearings in said housing, a sleeve through which said shaft extends, a second sleeve inclosing the first-named sleeve so as to provide a liquid passage therebetween, a rotary measuring member mounted on said shaft comprising a central compartment into which said sleeves extend and tanks of arc-like form arranged around said compartment, each tank having a discharge tube extending from one end thereof toward and concentric with the next adjacent tank; said second sleeve being in communication with said inlet passage and with said compartment; said compartment having a discharge port opening into each tank and outlet openings in one side wall thereof through which a portion of the liquid passing through the measuring member is withdrawn during each revolution, and a receptacle into which the withdrawn liquid is conducted.

28. In a liquid measuring device, a housing having an inlet passage, a shaft having its bearings in said housing, a rotary measuring member mounted on said shaft comprising a central compartment communicating with said inlet passage and having tanks thereon of arc-like form, each tank having a discharge tube extending toward and concentric with the next adjacent tank, and a receptacle outside of said housing; said compartment having a discharge port opening into each tank and outlet openings in one side wall thereof, one for each tank, and discharge tubes on the outer side of said side wall in communication with said outlet openings and with said receptacle.

In testimony whereof, we have hereunto set our hands at Los Angeles, California, this 14th day of December, 1915.

JAMES L. VAI.
GIOVANNI VAI.

In presence of—
  CHAS. J. CHANCE,
  L. BELLE WEAVER.